(12) United States Patent
Katsumata et al.

(10) Patent No.: US 7,758,006 B2
(45) Date of Patent: Jul. 20, 2010

(54) SWIVEL DEVICE FOR MONITOR

(75) Inventors: Tsutomu Katsumata, Osaka-hu (JP); Yasuyuki Uemurai, Osaka-hu (JP)

(73) Assignee: Simotec Inc., Higashiosaka-shi, Osaka-hu (JP)

( * ) Notice: Subject to any disclaimer, the term of this patent is extended or adjusted under 35 U.S.C. 154(b) by 0 days.

(21) Appl. No.: 11/958,834

(22) Filed: Dec. 18, 2007

(65) Prior Publication Data
US 2008/0272262 A1 Nov. 6, 2008

(51) Int. Cl.
*A47B 91/00* (2006.01)
(52) U.S. Cl. ............... 248/349.1; 248/292.12; 361/679.02
(58) Field of Classification Search ............... 248/349.1, 248/292.12, 289.11, 276.1, 186.2, 917–921; 361/679.21, 679.22, 679.01, 679.02
See application file for complete search history.

(56) References Cited

U.S. PATENT DOCUMENTS

| | | | | |
|---|---|---|---|---|
| 4,796,842 A | * | 1/1989 | Hamada et al. | 248/186.2 |
| 5,743,478 A | * | 4/1998 | Plestan | 242/231 |
| 6,025,964 A | * | 2/2000 | Yamamoto | 359/824 |
| 7,502,219 B2 | * | 3/2009 | Kuga | 248/349.1 |
| 2002/0126110 A1 | * | 9/2002 | Bowron | 345/204 |
| 2008/0149800 A1 | * | 6/2008 | Katsumata et al. | 248/349.1 |
| 2008/0192419 A1 | * | 8/2008 | Sawai | 361/681 |

* cited by examiner

*Primary Examiner*—Amy J Sterling
*Assistant Examiner*—Tan Le
(74) *Attorney, Agent, or Firm*—Browdy And Neimark, PLLC

(57) ABSTRACT

A swivel device for a monitor capable of adjusting the swivel operating force even after assembling. The device includes a base plate, an output gear disposed rotatably on the base plate and rotated and driven by an electric motor, a clutch plate rotated and driven while frictionally contacting with the output gear by way of a slip portion, a monitor mounting plate mounted and fixed on the clutch plate, and a part for adjusting the contact frictional force of the clutch plate on the output gear.

1 Claim, 2 Drawing Sheets

SWIVEL DEVICE FOR MONITOR

TECHNICAL FIELD

The present invention relates to a swivel device for monitor for changing the direction of a monitor screen of a television monitor or the like laterally.

TECHNICAL BACKGROUND

A conventional swivel device for monitor was not designed to adjust the operating force when rotating and manipulating the monitor manually in horizontal direction, that is, the slip torque could not be adjusted.

Since the slip torque could not be adjusted after assembling, the yield was poor on the production line, and market complaints could not be solved, and an optimum operating force must be adjusted individually according to each television size and its weight, and a manual swivel device was demanded.

DISCLOSURE OF THE INVENTION

Problem to be Solved by the Invention

It is hence an object of the invention to present a swivel device for monitor capable of adjusting the swivel operating force even after assembling, that is, adjusting the slip torque, by solving the problems in the prior art.

Means for Solving Problem

The swivel device for monitor of the invention includes a base plate, an output gear disposed rotatably on the base plate and rotated and driven by an electric motor, a clutch plate rotated and driven while frictionally contacting with the output gear by way of a slip portion, a monitor mounting plate mounted and fixed on the clutch plate, and means for adjusting the contact frictional force of the clutch plate on the output gear. Preferably, the means for adjusting the contact frictional force includes a slip torque adjusting plate for pressing the clutch plate, and an adjusting screw for adjusting the pressing force. Preferably, the means for adjusting the contact frictional force includes the slip torque adjusting plate, a fixing bench for slip torque adjusting plate for fixing the slip torque adjusting plate, and provided with a gap across the base plate, and the adjusting screw, and the contact frictional force is adjusted by loosening or tightening the adjusting screw. Preferably, the output gear is rotated and driven through a worm gear provided in an output shaft of the electric motor.

1) Since the slip torque can be adjusted even after assembling, the production line yield is enhanced, and market complaints can be solved.

2) Depending on the television size and weight, the operating force of manual swivel can be commonly adjusted by a same device.

THE BEST MODE FOR CARRYING OUT THE CLAIMED INVENTION

FIG. 1 is a perspective view of an embodiment of a swivel device for monitor of the invention, and FIG. 2 is its plan view, in which reference numeral 1 is a base plate, 2 is an electric motor, 3 is a reduction gear train, 4 is an output gear, and 5 is a monitor mounting plate.

The base plate 1 may be mounted on a proper monitor platform (not shown), or may be replaced by the platform.

The output gear 4 is rotated and driven by an electric motor 2 by way of a reduction gear train 3. A proper monitor (not shown) is mounted on the monitor mounting plate 5.

FIG. 3 is a sectional magnified view along line A-A in FIG. 2, in which reference numeral 6 is a fixing bench for slip torque adjusting plate, 7 is a slip torque adjusting plate, 8 is an adjusting screw, and 9 is a clutch plate.

The fixing bench 6 for slip torque adjusting plate is coaxially inserted in a hole formed in the center of rotation of the output gear 4, and is fixed by a pin 1a projecting from the base plate 1 so as not to rotate.

The slip torque adjusting plate 7 is mounted on the fixing bench 6 for slip torque adjusting plate. The slip torque adjusting plate 7 is fixed by a protrusion 6a projecting from the fixing bench 6 for slip torque adjusting plate so as not to rotate.

The adjusting screw 8 is inserted into and engaged with the fixing bench 6 for slip torque adjusting plate and the slip torque adjusting plate 7 from the downside of the base plate 1. A gap G is formed between the base plate 1 and the fixing bench 6 for slip torque adjusting plate.

A slip portion 9a is formed in the downside of the clutch plate 9, and slides on the upside of the output gear 4. An inner flange 9b is formed in the clutch plate 9, and its upside slides on the slip torque adjusting plate 7.

The swivel device for monitor of this embodiment is built in such configuration, and therefore when the output gear 4 is rotated and driven by the electric motor 2, the clutch plate 9 frictionally contacting therewith is put in rotation through the slip portion 9a, and the monitor (not shown) is rotated laterally in the horizontal direction by way of the monitor mounting plate 5.

The slip torque adjusting plate 7 presses the clutch plate 9 from above, and brings the clutch plate 9 and the output gear 4 into mutual frictional contact, and further a gap G is formed between the fixing bench 6 for slip torque adjusting plate and the base plate 1, and therefore by tightening or loosening the adjusting screw 8, the pressing force on the clutch plate 9 by the slip torque adjusting plate 7, that is, the contact frictional force is adjusted, and the monitor manual operating force can be adjusted by increasing or decreasing the pressure on the slip portion 9a.

Since the output shaft of the electric motor 2 is provided with a worm gear, the output gear 4 is not rotated during manual operation of the monitor. Hence, it is intended to rotate while slipping the slip portion 9a provided between the clutch plate 9 and the output gear 4.

In the embodiment, the fixing bench 6 for slip torque adjusting plate and the slip torque adjusting plate 7 are formed of different members, but they may be formed of an integral member.

DESCRIPTION OF THE REFERENCE NUMERALS

Figure 1:
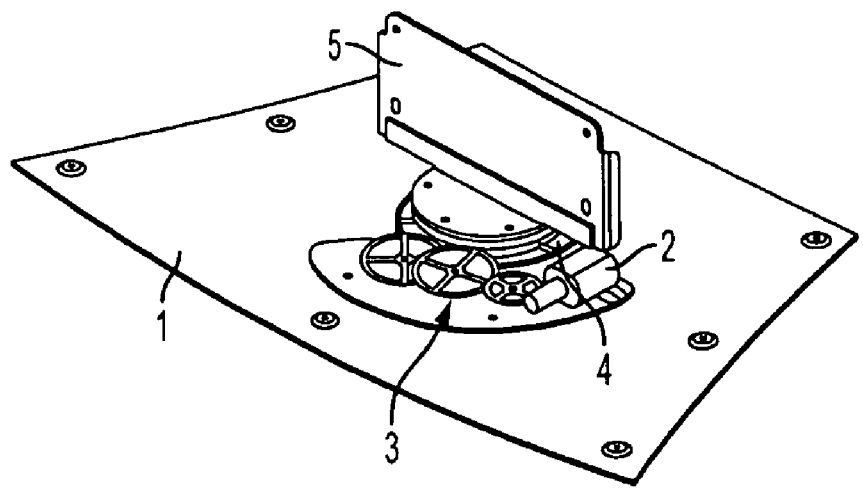
FIG. 1 is a perspective view of an embodiment of a swivel device for monitor of the invention.
Figure 2:
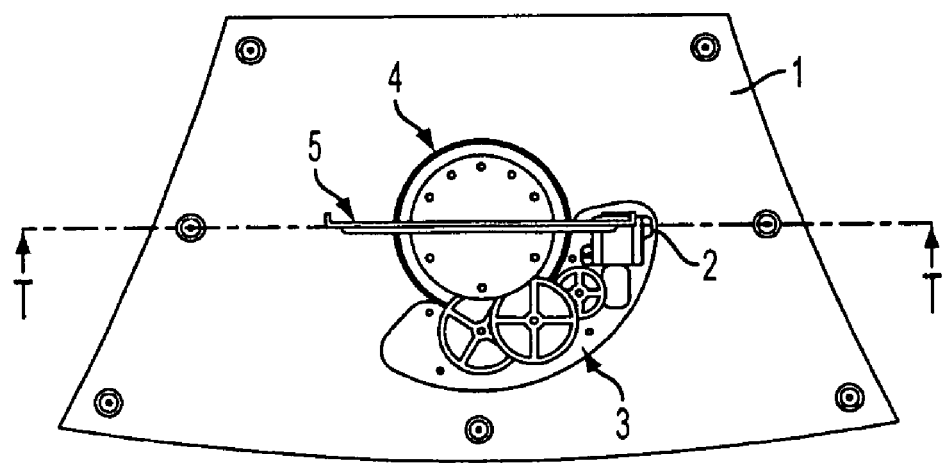
FIG. 2 is a plan view of FIG. 1.
Figure 3:
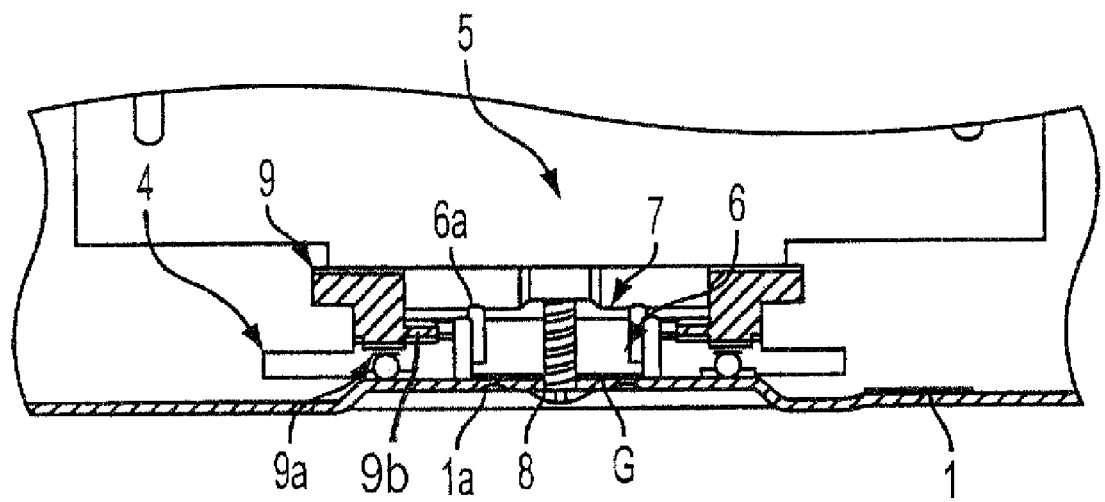
FIG. 3 is a sectional magnified view along line A-A in FIG. 2.

1 Base plate
2 Electric motor
3 Reduction gear train
4 Output gear

5 Monitor mounting plate
6 Fixing bench for slip torque adjusting plate
6a Protrusion
7 Slip torque adjusting plate
8 Adjusting screw
9 Clutch plate
9a Slip portion
9b Inner flange
G Gap

DRAWINGS

FIG. 1
FIG. 2
FIG. 3

What is claimed is:

1. A swivel device for a monitor comprising:
a base plate (1);
an output gear (4) disposed rotatably on said base plate and driven by an electric motor(2) by way of a reduction gear train (3);
a clutch plate (9) rotated and driven while frictionally contacting with a slip portion (9a) formed at the downside of the output gear;
a monitor mounting plate (5) mounted and fixed on the clutch plate;
a fixing bench (6) coaxially inserted in a hole in the center of the output gear, a gap (G) being formed between the base plate and the fixing bench;
a slip torque adjusting plate (7) mounted on the fixing bench and slidably contacting with an inner flange (9b) formed in the clutch plate; and
an adjusting screw (8) inserted into and screwed with the fixing bench for adjusting the contact friction force of the clutch plate on the output gear.

\* \* \* \* \*